Dec. 25, 1962 H. A. TOULMIN, JR 3,070,643
METHOD AND APPARATUS FOR GENERATING ELECTRICAL
POWER FROM SOLAR ENERGY
Filed March 18, 1959 4 Sheets-Sheet 1
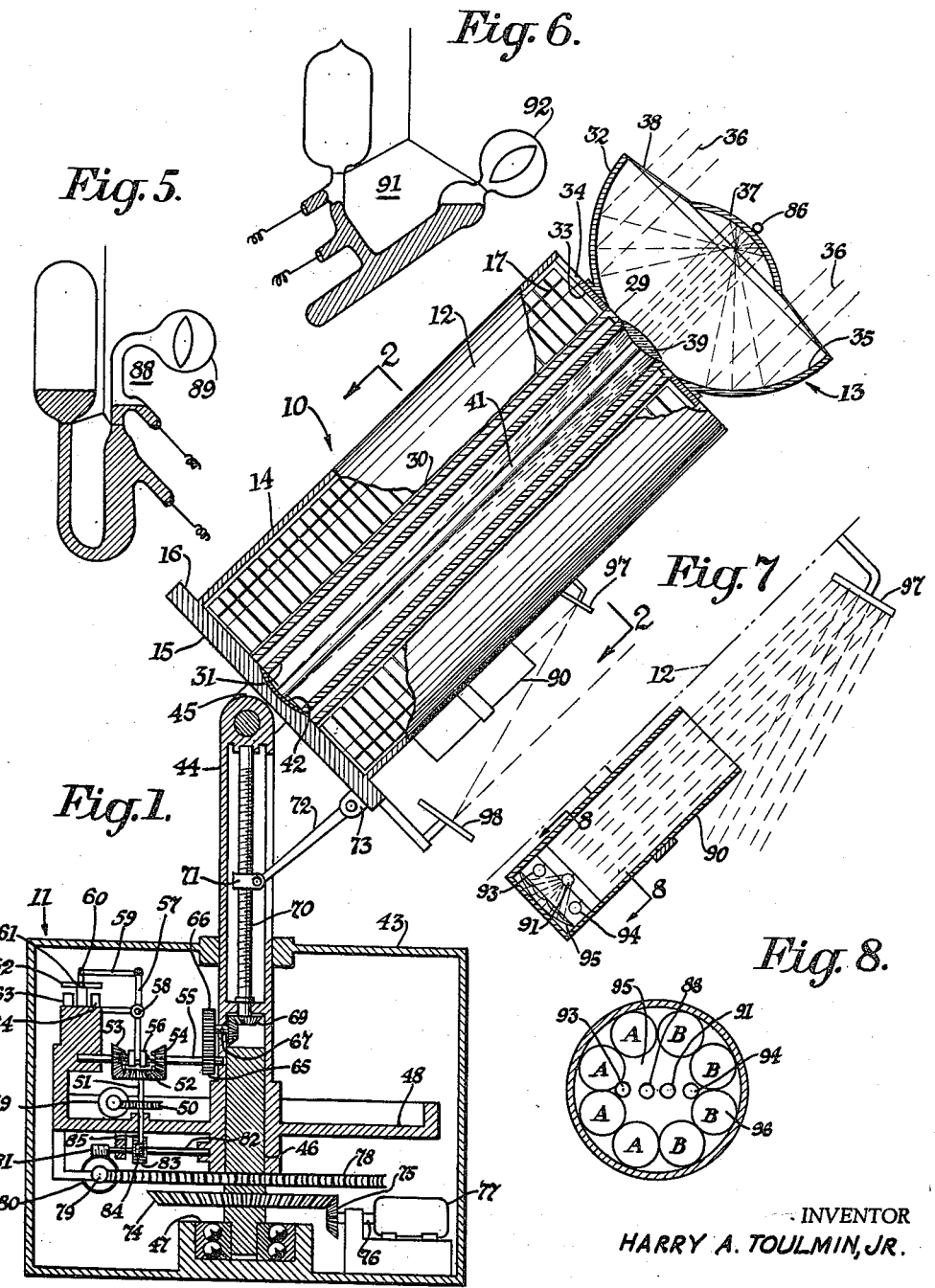
INVENTOR
HARRY A. TOULMIN, JR.
BY Toulmin & Toulmin
ATTORNEYS Dec. 25, 1962   H. A. TOULMIN, JR   3,070,643
METHOD AND APPARATUS FOR GENERATING ELECTRICAL
POWER FROM SOLAR ENERGY
Filed March 18, 1959                                   4 Sheets-Sheet 2
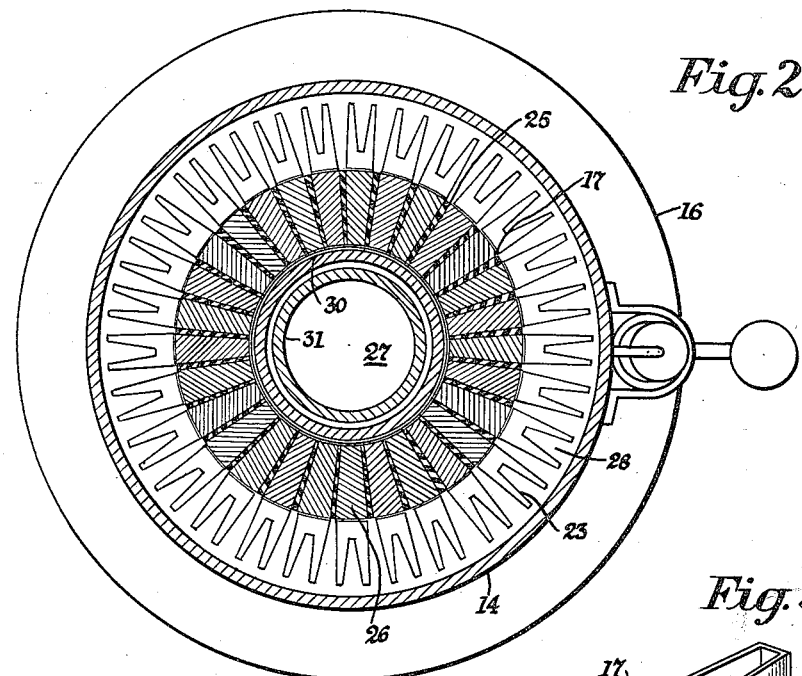
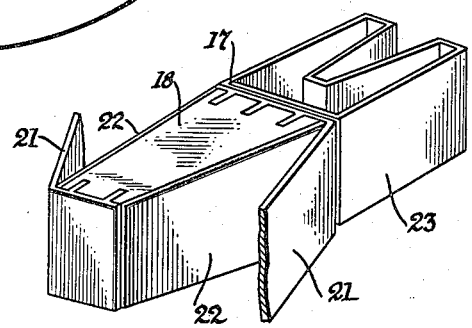
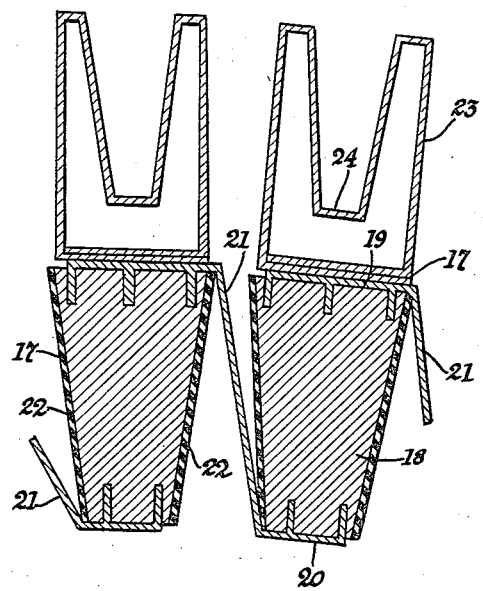
INVENTOR
HARRY A. TOULMIN, JR
BY *Toulmin & Toulmin*
ATTORNEYS Dec. 25, 1962 H. A. TOULMIN, JR 3,070,643
METHOD AND APPARATUS FOR GENERATING ELECTRICAL
POWER FROM SOLAR ENERGY
Filed March 18, 1959 4 Sheets-Sheet 3
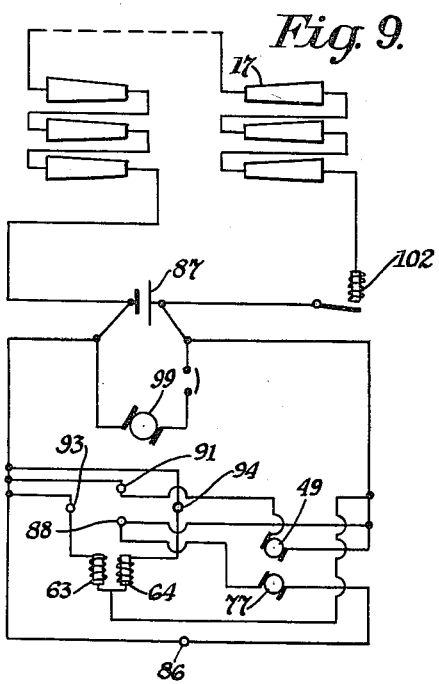
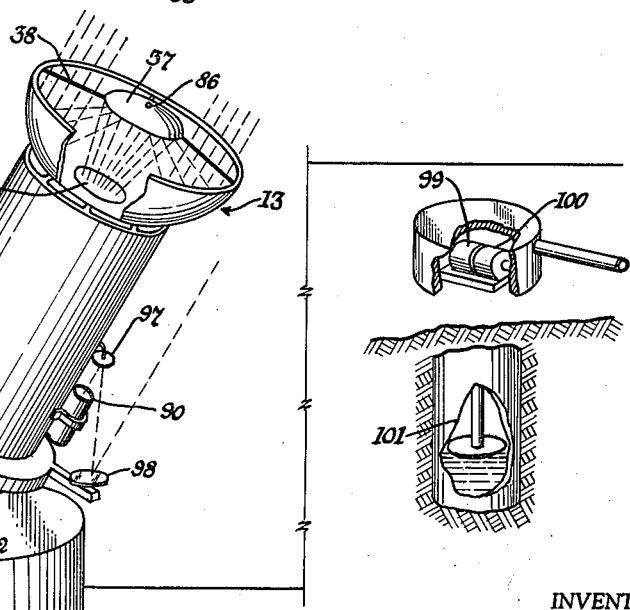
INVENTOR
HARRY A. TOULMIN, JR.
BY Toulmin & Toulmin
ATTORNEYS

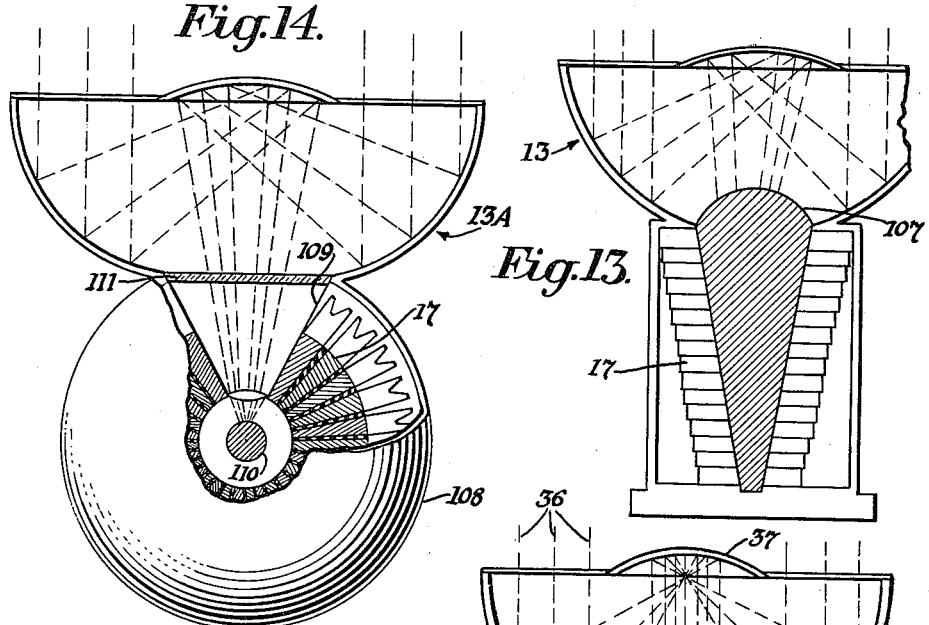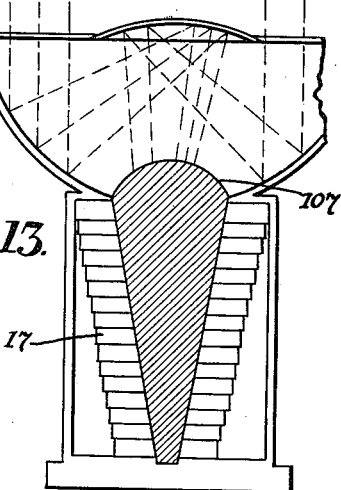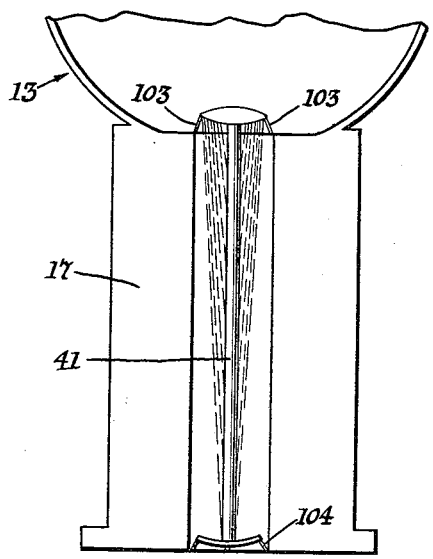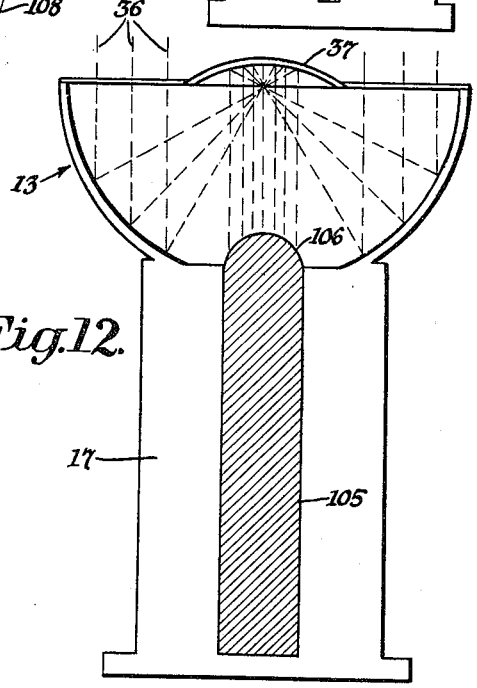

United States Patent Office 3,070,643
Patented Dec. 25, 1962

3,070,643
METHOD AND APPARATUS FOR GENERATING ELECTRICAL POWER FROM SOLAR ENERGY
Harry A. Toulmin, Jr., Dayton, Ohio, assignor to The Commonwealth Engineering Company of Ohio, Dayton, Ohio, a corporation of Ohio
Filed Mar. 18, 1959, Ser. No. 800,321
11 Claims. (Cl. 136—4)

The present invention relates to solar energy, more particularly to an apparatus for producing electrical power from solar energy.

It has long been recognized that great quantities of solar energy are received daily upon the surface of the earth. Considerable time and effort have been expended upon the problem of harnessing solar energy. To date considerable progress has been made in devising reflectors which concentrate the heat rays from the sun at a single point. The high temperatures which result in this concentration of the heat rays have been subsequently used in metallurgical experiments and the like primarily in an effort to discover high heat resistant materials.

Some consideration has also been given to the conversion of solar energy into forms of energy, which may be utilized by industry, in order to provide additional sources of power. Several forms of solar batteries have already been proposed. However, these batteries are capable of generating very small quantities of electricity. In addition, the conventional battery does not rely upon the concentration of the rays of the sun but employs the direct rays of the sun to energize elements which are similar to thermo-couple junctions. However, these elements are extremely delicate and pose many problems in constructing practicable solar batteries.

The present invention is directed to an apparatus for producing electricity from solar energy which is simple in construction and capable of generating sufficient quantities of electricity to power electric motors and the like. This solar generating apparatus essentially comprises a plurality of thermo-electric elements arranged to form a hollow body. The inner ends of the thermo-electric elements are energized by concentrated solar heat rays. The outer ends of each of the elements are cooled by any suitable means. The result is that a temperature gradient is formed in each of these elements. This temperature gradient, in turn, generates an E.M.F. in each of the elements. The elements are electrically connected together so as to combine all of the generated E.M.F.'s, whereby the resultant electric power is sufficient to form a practicable source of power.

In addition, a heliostat mechanism is provided which maintains the reflector of the solar generator directed at the sun at all times. This mechanism is actuated by the sun and is automatic in operation.

Several modifications of the present invention are also disclosed. These modifications include a structure which enables the solar apparatus to simultaneously generate steam along with the production of electric power. Furthermore, the concentrated solar heat rays may be utilized in various ways in order to energize the thermo-electric elements. These structures will be set forth in detail in the detailed description of this invention.

It is, therefore, the principal object of this invention to provide a novel method and apparatus for producing electric power from solar energy.

It is another object of this invention to provide a solar generator which is efficient in operation and simple in construction.

It is a further object of this invention to provide a solar generator which comprises a plurality of thermo-electric elements efficiently arranged to be energized by concentrated solar energy.

It is an additional object of this invention to provide a novel method and apparatus for concentrating heat rays from the sun in order to generate electrical power therefrom.

It is still another object of this invention to provide a solar generator wherein the electrical power generated may be closely regulated.

Other objects and advantages of this invention will become apparent upon reference to the following description when taken in conjunction with the accompanying drawings wherein:

FIGURE 1 is a side elevational view of the solar generating apparatus of this invention with the generator and heliostat mechanism being shown in section to show the details of the heliostat driving mechanism;

FIGURE 2 is a sectional view taken along the lines 2—2 of FIGURE 1;

FIGURE 3 is a perspective view of a thermo-electric element which is employed in this solar generator;

FIGURE 4 is an extended view of two of the thermo-electric elements connected together in a linear arrangement;

FIGURES 5 and 6 are diagrammatic views of the mercury vapor switches employed in the focusing mechanism;

FIGURE 7 is a side elevational view, in vertical section, showing the structure for actuating the heliostat mechanism;

FIGURE 8 is a sectional view taken along the lines 8—8 of FIGURE 7, showing in plan view the arrangement of the mirrors to actuate the heliostat mechanism;

FIGURE 9 is a diagram of the electrical circuit employed with this solar generating apparatus;

FIGURE 10 is an over-all perspective view of the solar generating apparatus shown in FIGURE 1; and FIGURES 11 to 14 are diagrammatic views of modifications of the disclosed embodiment of this invention.

Returning now to the drawings, more particularly to FIGURE 1, wherein like reference symbols indicate the same parts throughout the various views, the solar energy apparatus disclosed in this invention comprises a solar generator indicated generally at 10, mounted upon a heliostat mechanism 11. The solar generator 10, in turn, comprises a generator unit 12, upon which is supported a solar heat ray concentration system 13. The structure of each of these components, together with their interrelationship will be subsequently described in detail.

The generator unit 12 comprises a cylindrical outer casing 14 mounted upon a base 15 the peripheral edges of which extend beyond the circumference of the outer casing 14 to form a flange 16.

The cylindrical casing 14 is almost completely occupied by a plurality of thermo-electric elements 17, such as disclosed in U.S. Patent No. 2,280,137. These thermo-electric elements are systematically arranged within the casing in a manner to be subsequently described.

The thermo-electric element 17 comprises a block 18 (see FIGURE 3) which consists of a thermo-electric alloy so characterized that upon application of heat to the alloy considerable currents are generated at the surface of the block. Each block has an outer surface 19 and an inner surface 20. These currents are taken from the alloy by means of metallic strips or conductors 21 which form thermo-electric junctions with the block 18. Each of the strips, or conductors 21, is in contact with the outer surface 19 of one element and the inner surface 20 of the adjacent element. The blocks 18 are insulated from each other by means of insulating strips 22. A copper strip 23 is secured to the outer surface 20 of each block to serve as a cooling fin for said outer surface. This strip is preferably of the same thickness as the block 18 and has the center portion thereof bent into a U-shaped configuration, as indicated at 24. With this arrangement, the inner surface 20 of each block is employed to form the hot junction and the outer surface 19 to form the cold junction of the thermo-electric unit.

Each of the blocks 18 is substantially wedge-shaped in such a manner that a plurality of the thermoelectric units 17 are assembled in a single plane to form an annulus 25, as indicated in FIGURE 2. A plurality of the annuli 25 are then stacked upon each other to form a hollow cylinder 26, having a central core 27. The hollow cylinder 26 is positioned within the outer casing 14 to rest upon the base 15. This results in the formation of annular space 28 within which are disposed the copper cooling strips 23 of each of the thermo-electric elements 17. A suitable coolant is circulated through the annular space 28 in order to cool the outer surfaces 19 of each of the thermo-electric elements. This cooling process may be accomplished in any suitable and well-known manner and, hence, it is not necessary to describe the cooling structure.

A double-walled cylinder 29 is positioned within the central core 27. The double-walled cylinder 29 has an outer wall 30 and an inner wall 31. The walls 30 and 31 may be either metal or ceramic depending upon the particular use to which the double-walled cylinder is to be applied. Suitable means are provided to circulate water between the walls of the cylinder. The water may serve one of several functions. If desired, water may be circulated in order to cool the heated inner surfaces of the thermo-electric elements.

By varying the cooling effect of the water the temperature of the inner faces of the thermo-electric elements may be controlled. This enables the generated E.M.F. to be closely regulated.

Water may also be pumped between the walls of the double-walled cylinder in order to equally distribute the heat over the surface of the central core 27. Or, if desired, the water may be converted into steam from the concentrated solar heat waves by providing suitable connections to circulate feed water between the walls of the cylinder and suitable apparatus to utilize the steam power.

Turning now to the heat ray concentration system 13, as illustrated in FIGURES 1 and 10, this system comprises a reflecter 32 which is mounted upon the top end of the generator unit 12 by means of a supporting plate 33. The supporting plate 33 also serves to close the open end of the cylindrical outer casing 14. Suitable openings 34 are provided in the supporting plate 33 in order to circulate a suitable fluid within the annulus 28 of the generating unit.

The reflector 32 has a highly polished inner surface 35 and is essentially in the shape of a parabola so as to concentrate the heat rays of the sun, as represented by the paths 36, into a second reflector 37 mounted by means of suitable supporting members 38 at substantially the focal point of the reflector 32. The second reflector 37, in turn, further concentrates the heat rays of the sun and directs them to a lens 39 which closes the top open end of the central core 27 of the generator unit 12. The lens 39 is so ground as to converge these heat rays along the length and on axially spaced points on a metallic cylinder 41 which is positioned along the central axis of the central core 27 and extends throughout the length of said core. In effect, a series of spots or heat areas are provided along the length of the rod within the generating unit. A polished surface 42 is mounted on the bottom end of the core 27 of close the core. This polished reflector will reflect heat rays back along the rod 41 and onto the thermo-electric elements 17 to energize the same. Alternatively, there may be a black surface, at the bottom of the central core 27 so as to absorb the beam of solar energy and subsequently become heated.

The closed central portion 27 may be filled with a gas such as mercury vapor which has a good heat conductive characteristic in respect to gases. By employing such a heat conductive gas, the efficiency of the generator may be increased.

In order that the solar generator may perform efficiently, it is necessary that the reflector 32 be facing the sun at all times. In this way the maximum quantity of solar energy is collected upon the reflector. Various mechanisms have been proposed in the past to provide a device which is directed towards the sun at all times. Such devices are termed heliostats. This apparatus employs a heliostat mechanism which is enclosed within a housing 43 and illustrated in FIGURE 1. While any suitable and well known heliostat mechanism may be employed, the particular mechanism which is about to be described is suitable.

Projecting upwardly from the housing 43 is a rotatably mounted hollow shaft 44, the end of which is pivotally connected to a bracket 45 secured to the base 15 of the generator unit 12. The open lower end of the shaft 44 is mounted upon a solid shaft 46, which is rotatably mounted in a suitable bearing 47. A suitable ratchet mechanism (not shown) is provided between the hollow shaft 44 and the solid shaft 46 to enable the hollow shaft 44 to rotate in one direction only with respect to the shaft 46.

A plate 48 is integrally mounted on the lower portion of the shaft 44. This plate has mounted thereon an electric motor 49 which, through a worm gear 50, drives a shaft 51 upon the end of which is fixedly mounted a bevel gear 52. The bevel gear 52 engages a pair of freely rotating bevel gears 53 and 54. The bevel gear 54 is freely mounted upon a shaft 55 upon which is mounted a clutch member 56. The clutch member 56 has an annulus of teeth at each end, which teeth are adapted to engage cooperating teeth on the inner faces of the bevel gears 53 and 54. The clutch 56 is mounted upon an arm 57 which is pivotally mounted at approximately its midpoint by means of a pin 58. The top end of the arm 57 is connected by means of a link 59 to a second arm 60 which is pivotally mounted at 61. Mounted upon the arm 60 is an armature 62 which is positioned to be attracted by either one of the solenoids 63 and 64. Actuation of either solenoid 63 or 64 will result in the attraction of the armature 62. This, in turn, will cause the arm 60 to pivot and this pivoting motion will be transmitted to the arm 57 by means of the link 59. The movement of the arm 57 will, in turn, result in axial movement of the clutch 56 into engagement with either the bevel gear 53 or 54. Since the clutch 56 is fixed upon the shaft 55 engagement of the clutch with either bevel gear 53 or 54 will determine the rotation of the shaft 55.

A spur gear 65 is fixed upon the other end of the shaft 55 and engages a second spur gear 66. The spur gear 66 is mounted upon a shaft 67 upon the end of which is a bevel gear 68 in engagement with a bevel gear 69 which is rigidly fastened upon the end of a threaded shaft 70 journalled at each end within the hollow shaft 44. There is a traveling nut 71 threadedly cooperating with the threaded shaft 70 and a link 72 pivotally connected at one end to the traveling nut 71 and pivotally connected at the other end to a bracket 73 fixed to the base 15 of the generator unit 12.

The solid shaft 46 is driven by means of a bevel gear 74 thereon which engages a driving bevel gear 75 mounted upon a shaft 76 extending from an electric motor 77. Mounted on the solid shaft 46 and integral with the gear 74 is a gear 78 which engages a worm 79. The worm 79 is fixed to rotate with a worm wheel 80 which in turn engages a worm 81 affixed on the end of a shaft 82. The shaft 82 has a worm wheel 83 secured thereon which engages a worm 84 affixed to an end 85 of the shaft 51. Thus the electric motor 49 serves both to rotate the solar generator to follow the daily movement of the sun and to drive the threaded shaft 70 to vary the angle of the generator as the declination of the sun changes.

To actuate the above described heliostat mechanism, reference is next made to the circuit diagram illustrated in FIGURE 9 and the sectional view depicted in FIGURE 8. A mercury vapor switch 86 sufficiently sensitive to be actuated by the heat of the sun, is mounted upon the outer surface of the second reflector 37. The switch 86 is connected in series with the electric motor 77 and a storage battery 87. Also in series with the electric motor 77 is a mercury switch 88 having a gas filled body 89 such as illustrated in FIGURE 5, which is closed when the gas filled body is not heated. This mercury switch 88 is disposed within the center of a cylindrical casing 90 mounted on one side of the outer casing 14 of the generator unit 12. The mercury switch 88 is suspended so that it will be in a vertical operative position at all angles of the generator unit.

A second mercury switch 91 is mounted adjacent the mercury switch 88. The mercury switch 91 is the type illustrated in FIGURE 6, which is adapted to be closed when a gas filled body 92 is heated. The switch 91 is connected in series with the electric motor 49 which is also connected across the storage battery 87.

Also located within the cylindrical casing 90 are a pair of mercury switches 93 and 94 which are of the type adapted to be closed when their respective gas filled bodies are heated. The mercury switch 93 is connected so as to actuate the solenoid 63 and the mercury switch 94 is connected to actuate the solenoid 64. The mercury switches 93 and 94 are located to one side of the mercury switches 88 and 91 and are also suspended so as to be in a vertical opposite position at all times. The mercury switches 88 and 91 are located at the focal point of a reflector 95 located at the bottom of the cylindrical casing 90 and having a diameter substantially equal to the internal diameter of the cylindrical casing. A plurality of smaller reflectors 96 are mounted above the reflector 95 around the periphery thereof. Half of the total number of reflectors 96 indicated at A are positioned to concentrate heat rays upon the mercury switch 93 and the other half of the reflectors 96 indicated at B are positioned to concentrate rays upon the mercury switch 94. It is pointed out that the mercury switches 88 and 91 through 94 are suspended by short lengths of cord or the like in order than they will at all times be in the focal points of their respective reflectors.

Heat rays of the sun are reflected into the cylindrical casing 90 by means of a reflector 97 mounted on the outer wall of the cylindrical casing 14. Reflector 97, in turn, receives heat rays from a second reflector 98 which is fixedly mounted so as to reflect at all times to the reflector 97.

With the above description of the heliostat mechanism in mind, the modus of operation will now be described. The mercury switch 86 is so positioned as to be actuated by the first sun rays received at the beginning of the day. Actuation of the mercury switch 86 will, in turn, result in energization of the electric motor 77. Electric motor 77 represents a coarse control over the rotative movement of the solar generator. Operation of the electric motor 77 will accordingly rotate the hollow shaft 44 and the solar generator 12 to a position to where the heat rays of the sun are reflected into the cylindrical casing 90. When the heat rays of the sun are received in the casing 90, they will subsequently be reflected by the reflector 95 to heat the mercury switch 88. This, in turn, will open the mercury switch 88 and stop operation of the motor 77. At this point, however, the mercury switch 91 which is also located so as to be heated by sun rays reflected from the reflector 95 will close and will energize the electric motor 49. The electric motor 49 is geared to the hollow shaft 44 to rotate the shaft at a speed equal to the apparent speed of the sun as it appears to move from east to west during the day. Consequently, when the heat rays of the sun are reflected within the cylindrical casing 90 to actuate the electric motor 49, the solar generator will be directed at the sun at all times when the sun is shining. Should the sun disappear behind a cloud, electric motor 49 would cease to operate and the solar generator would cease to rotate about the heliostat mechanism. However, as soon as the sun reappeared from behind the clouds, the mercury switch 86 would be actuated and the solar generator again would be directed at the sun through the procedure previously described.

In order to correct the angular position of the generator unit so that the central axis on the generator unit coincides with the declination of the sun, the mercury switches 93 and 94 serve to actuate the corresponding solenoid in order to increase or decrease the angle of the generating unit. The diameter of the cylindrical casing 90 is small in respect to its length. The heat rays of the sun reflected into the casing will be received by either the four reflectors associated with the mercury switch 93 or the four reflectors similarly associated with the mercury switch 94. Should the angle of the generating unit be greater than the angle of declination of the sun, heat rays from the sun will be reflected into the cylindrical casing 90 to be reflected from the reflectors associated with mercury switch 93 and subsequently close said mercury switch. This, in turn, will result in the energization of solenoid 63 with the resultant attraction of the armature 62 towards solenoid 63. Consequently, the arm 57 is pivoted so as to place the clutch 56 into engagement with the bevel gear 54. Through the system of gears interconnecting the bevel gear 54 with the threaded shaft 70, shaft 70 will rotate in a counter-clockwise direction. The cooperating threads on the threaded shaft and the traveling nut are so selected that counter-clockwise rotation of the threaded shaft results in a downward movement of the traveling nut; this downward movement of the traveling nut results in lowering and thereby decreasing the angle of the generating unit. When the angle of the generating unit corresponds with the declination of the sun, the heat rays of the sun will be focused by the reflectors 97 and 98 to a point approximately in the center of the cylindrical casing 90. Therefore, few, if any, of the heat rays will contact the mercury switch 93 with the result that the switch will quickly cool off and will become open, thereby de-energizing the solenoid 63.

Therefore, it can be seen with the heliostat mechanism employed with this apparatus, the solar generator will be directed at the sun at all times.

Returning now to the solar generating unit and the structure employed in producing electrical energy from solar energy, it should be borne in mind that any one of several different methods may be used. Each one will be discussed in turn.

As pointed out previously, the generator unit may be employed with or without a double-walled tube disposed within the hollow core of the cylinder of thermo-electric units. In the event that the double-walled cylinder is not used, several methods are possible by which the thermo-electric elements may be energized. As indicated previously, and as illustrated in FIGURE 1, the lens 39 may be so chosen as to direct the heat rays of the sun against the metal rod 41 along the central axis of the generator unit. The thermo-electric elements should be so mounted in the cylinder that the inner faces of the elements are proximate to the rod 41. The energy inherent in the rod 41 will result in heating of the inner surfaces 20 of the thermo-electric elements 17. As the outer surfaces 19 are suitably cooled, an E.M.F. will be generated across the alloy block 18 and a current will flow between the inner and outer faces of the thermo-electric element. As indicated in the circuit diagram in FIGURE 10, the electric conductors or strips 21 between the thermo-electric elements 17 are connected in series so that the E.M.F. obtained from the solar generator is the combined E.M.F. in each of the thermo-electric elements. This power obtained from the solar generator may be then used to charge a battery 87 and, for example, to operate an electric motor 99 which is drivingly connected to a pump 100 located in a well 101. A suitable voltage regulator 102 is employed to open the circuit when the battery 87 is charged. It is understood that the voltage and ampere output of the solar generator may be varied by connecting the thermo-electric elements in series or parallel relationships.

A modification of the embodiment shown in FIGURE 1 is illustrated in FIGURE 11. FIGURE 11 has a solar generator arranged therein similar to the arrangement disclosed in FIGURE 1. However, the lens 39 is mounted above the open end of the hollow core 27 by supports 103. Also, the reflector 42 is mounted at the lower end of the central core 27 by supports 104 in such a manner that the lower end of the core is not closed. Thus, in this modification the central core 27 is open at both the top and bottom ends.

Several additional modifications of the solar generator unit are disclosed in FIGURES 12, 13 and 14. In each of these modifications a metallic mass is provided upon which the concentrated sun rays are directed. The resultant heating of this metallic mass, in turn, serves to heat the inner faces of the thermo-electric elements, either through conduction or by radiation.

The modification disclosed in FIGURE 12 employs an arrangement of components similar to that proposed in FIGURE 11. However, a rod-like metallic mass 105 is mounted within the central core 27 of the hollow cylinder. The metallic mass 105 closely fits within the central core so as to contact the inner ends of the thermo-electric elements. The top of the mass 105, indicated at 106 is rounded to present a greater heat conductive surface to the heat rays reflected from the lens system.

In the embodiment disclosed in FIGURE 13, a solid tapered metallic core 107 is mounted within the central core of a plurality of thermo-electric elements arranged to form a tapered cylinder. The thermo-electric elements are so positioned in respect to the metallic core 107 that the inner surfaces of each of the thermo-electric elements are in contact with the surface of the tapered metallic core. A concentration system is employed which concentrates the heat rays of the sun upon the rounded upper end of the metallic core 107. As the concentrated heat rays are distributed over the top face of the metallic core 107, the metallic core will subsequently become heated. This heat will, in turn, be transmitted to the inner faces of each of the thermo-electric elements. The resulting solar generator is a unit wherein the heat of the concentrated heat rays from the sun is transmitted directly to the thermo-electric elements through the medium of the metallic tapered core.

In the modification disclosed in FIGURE 14, a plurality of thermo-electric elements 17 are arranged in the form of a hollow sphere 108. This sphere has an opening 109 in the wall thereof. A lens concentration system 13a is mounted upon the sphere 109 in such a manner that the heat rays from the sun are concentrated by the second reflector 37a upon a metallic sphere 110 mounted in the center of the hollow sphere 108. In addition, the center of the hollow sphere 108 may be filled with a heat conductive gas such as mercury vapor and sealed by a transparent member, as indicated at 111.

It is noted that in this modification the heat rays are concentrated at a single spot, namely, the metallic sphere 110. Consequently, this sphere may be heated to a very high temperature dependent upon the characteristics of the metal comprising this sphere. Consequently, the inner surfaces of the thermo-electric elements may be heated to a higher temperature than with the embodiment disclosed in FIGURES 1 to 10. By suitably cooling the outer surfaces of the thermo-electric elements, as previously described, a considerably greater temperature gradient is obtained within each of the thermo-electric elements. As a result of this greater temperature gradient, higher E.M.F.'s are generated in each of the elements.

The result is a solar generator which has a higher ampere and voltage output than the embodiment previously described.

The modification of FIGURE 14 may be further modified by not sealing the center of the hollow sphere. Also, the metallic sphere 110 may be enlarged so as to fill the entire center and to contact the inner ends of the thermo-electric elements forming the sphere 108.

It is pointed out in each of the embodiments of this invention as described above, that the heat rays of the sun are first concentrated upon a metallic heat conductive mass and subsequently employed to energize the hot junctions of thermo-electric elements.

Thus it can be seen that the solar energy apparatus, as described, is simple in construction and efficient in operation. Furthermore, the structure of the disclosed solar generating apparatus is such that conventional thermo-electric elements may be employed. Not only is the disclosed solar generator capable of converting solar energy into electrical power but the solar generator is mounted upon a heliostat mechanism which continually directs the generator toward the sun. The resulting structure is a solar energy apparatus which may be readily mounted at virtually any geographic location and economically produce electrical power from solar heat rays.

It will be understood that this invention is susceptible to modification in order to adapt it to different usages and conditions, and, accordingly, it is desired to comprehend such modifications within this invention as may fall within the scope of the appended claims.

What I claim is:

1. A solar generator unit comprising a plurality of thermo-electric elements arranged to form a hollow body having an inner wall, a metallic mass within said hollow body in heat-conducting relationship to said inner wall, means comprising a lens system to concentrate rays of the sun onto said metallic mass within said hollow body so as to energize the thermo-electric elements by radiation from metallic mass, and means within said hollow body to reflect heat rays radiated from said metallic mass against the inner wall of said hollow body to further energize said thermo-electric elements.

2. A solar generator unit comprising a plurality of thermo-electric elements arranged to form a hollow cylinder having an inner wall, a metallic mass in the form of a cylinder within said hollow cylinder and spaced from the inner wall thereof, means closing each end of said hollow cylinder to define a closed chamber with the means on one end comprising a lens for concentrating the heat rays of the sun onto said metallic mass whereby said thermo-electric elements are energized by radiation from said metallic mass, the means closing the other end of said cylinder comprising a reflector for reflecting heat rays against the elements forming the inner wall of the hollow cylinder to further energize said thermo-electric elements.

3. A solar generator unit comprising a plurality of thermo-electric elements arranged to form a hollow cylinder having an inner wall, a metallic mass in the form of a cylinder within said hollow cylinder in heat conductive relationship with the inner wall thereof, means on one end of said hollow cylinder comprising a lens for concentrating the heat rays of the sun onto said metallic mass whereby said thermo-electric elements are energized by radiation from said metallic mass, and a reflector for reflecting heat rays against the elements forming the inner wall of the hollow cylinder to further energize said thermo-electric elements.

4. A solar generator unit comprising a plurality of thermo-electric elements arranged to form a hollow cylinder having an inner wall, a metallic mass in the form of a cylinder within said hollow cylinder in heat conductive relationship with the inner wall thereof, means closing each end of said hollow cylinder to define a closed chamber with the means on one end of said hollow cylinder comprising a lens for concentrating the heat rays of the sun onto said metallic mass whereby said thermoelectric elements are energized by radiation from said metallic mass, and a reflector for reflecting heat rays against the elements forming the inner wall of the hollow cylinder to further energize said thermo-electric elements.

5. A solar generator unit comprising a plurality of thermo-electric elements arranged to form a hollow cylinder having an inner wall, a metallic mass in the form of a cylinder within said hollow cylinder in heat conductive relationship with the inner wall thereof, means on one end of said hollow cylinder comprising a lens for concentrating the heat rays of the sun onto said metallic mass whereby said thermo-electric elements are energized by radiation from said metallic mass, the means closing the other end of said cylinder comprising a reflector for reflecting heat rays against the elements forming the inner wall of the hollow cylinder to further energize said thermo-electric elements.

6. A solar generator unit comprising a plurality of thermo-electric elements arranged to form a hollow cylinder tapering inwardly from one end thereof, a heat-conductive body comprising a metallic mass positioned within said cylinder and so shaped that the outer surface of said heat-conductive body contacts the inner surfaces of each of the thermo-electric elements comprising said cylinder, means on said one end of said tapering cylinder comprising a lens system to concentrate the heat rays of the sun onto said metallic mass so that the thermo-electric elements are energized by the transmission of heat from said mass.

7. A solar generator unit comprising a plurality of thermo-electric elements arranged to form a hollow sphere having an opening therein, a spherical metallic mass mounted within said hollow sphere and spaced from the inner wall thereof, means on said sphere closing said opening and comprising a lens for concentrating the heat rays of the sun onto said metallic mass so that the thermo-electric elements are energized by the radiation of heat energy from said metallic mass.

8. A solar generating unit comprising a plurality of thermo-electric elements arranged to form a hollow sphere, said sphere having an opening therein, a solid metallic sphere mounted within said hollow sphere, means on said sphere about said opening for concentrating the heat rays of the sun, and means for directing said concentrated rays through said opening on said metallic sphere to heat said sphere.

9. A solar generating unit comprising a plurality of thermoelectric elements arranged to form a tapering hollow cylinder, a heat-conductive body positioned within said cylinder and so shaped that the outer surface thereof contacts the inner surfaces of each of the thermoelectric elements, means for concentrating the heat rays of the sun upon the larger diameter end of said tapering heat-conductive body.

10. A solar generator unit comprising a plurality of thermo-electric elements arranged to form a hollow body having an inner wall, a solid metallic mass centrally disposed within said hollow body in heat-conducting relationship to said inner wall, and means comprising a lens system to concentrate rays of the sun onto said metallic mass within said hollow body so as to energize the thermo-electric elements by radiation from said metallic mass.

11. A solar generating unit comprising a plurality of thermo-electric elements arranged to form a hollow cylinder, a solid metallic mass disposed within and in contact with said hollow cylinder, and means for concentrating the heat rays of the sun upon said metallic mass.

References Cited in the file of this patent

UNITED STATES PATENTS

| | | |
|---|---|---|
| 608,755 | Cottle | Aug 9, 1898 |
| 2,864,879 | Toulmin | Dec. 16, 1958 |

FOREIGN PATENTS

| | | |
|---|---|---|
| 108,354 | Switzerland | Jan. 29, 1925 |
| 732,338 | France | June 14, 1932 |